(12) United States Patent
Morozov et al.

(10) Patent No.: US 6,898,348 B2
(45) Date of Patent: May 24, 2005

(54) SPECTRAL POWER EQUALIZER FOR WAVELENGTH-MULTIPLEXED OPTICAL FIBER COMMUNICATION LINKS

(75) Inventors: Valentine N. Morozov, San Jose, CA (US); Yevgeniy Churin, San Jose, CA (US); Jinxi Shen, San Ramon, CA (US)

(73) Assignee: JDS Uniphase Corporation, San Jose, CA (US)

( * ) Notice: Subject to any disclaimer, the term of this patent is extended or adjusted under 35 U.S.C. 154(b) by 223 days.

(21) Appl. No.: 09/818,909

(22) Filed: Mar. 28, 2001

(65) Prior Publication Data

US 2002/0067888 A1 Jun. 6, 2002

Related U.S. Application Data

(63) Continuation-in-part of application No. 09/727,446, filed on Dec. 4, 2000.

(51) Int. Cl.$^7$ ................................................. G02B 6/34
(52) U.S. Cl. ........................................... 385/37; 385/10
(58) Field of Search ............................ 385/37, 10, 15, 385/16, 18, 31

(56) References Cited

U.S. PATENT DOCUMENTS

| | | | |
|---|---|---|---|
| 4,995,721 A | * 2/1991 | Krupa et al. ................ 356/305 |
| 5,371,586 A | * 12/1994 | Chau ........................... 356/301 |
| 5,745,271 A | 4/1998 | Ford et al. ................... 359/130 |
| 5,917,188 A | * 6/1999 | Atkinson et al. ....... 250/339.13 |
| 5,982,791 A | * 11/1999 | Sorin et al. .................... 372/25 |
| 6,128,078 A | 10/2000 | Fateley ......................... 356/330 |
| 6,271,917 B1 | * 8/2001 | Hagler ........................ 356/310 |
| 6,275,623 B1 | * 8/2001 | Brophy et al. ................ 385/14 |
| 6,327,280 B1 | * 12/2001 | Ducellier et al. ............. 372/20 |
| 6,438,396 B1 | * 8/2002 | Cook et al. ................. 600/310 |

OTHER PUBLICATIONS

"Dynamic Spectral Power Equalization Using Micro-Opto-Mechanics" Ford et al. IEEE Photonics Technology Letters, vol. 10, No. 10 Oct. 1998 pp. 1440-1442.

* cited by examiner

Primary Examiner—Frank G. Font
Assistant Examiner—Kevin C Kianni
(74) Attorney, Agent, or Firm—Randy W. Lacasse; Lacasse & Associates, LLC (57) ABSTRACT

A method and apparatus is described for controlling the attenuation of multiple wavelengths signals propagating in an optical fiber, that may have a time-dependent power in each signal, to provide an output signal having a desired attenuated power in each of the multiple signals. An equalizer may be used that has various optical elements to focus and disperse light, such as a concave diffraction grating and a modulator array having modulators disposed on a concave surface. The equalizer may also be coupled to various components such as a circulator or thermally expanded core fibers.

16 Claims, 8 Drawing Sheets

SPECTRAL POWER EQUALIZER FOR WAVELENGTH-MULTIPLEXED OPTICAL FIBER COMMUNICATION LINKS

This application is a continuation-in-part of U.S. patent application Ser. No. 09/727,446 filed Dec. 4, 2000.

FIELD OF THE INVENTION

This invention relates to the field of optical communications and, in particular, to attenuation devices used in optical communication networks.

BACKGROUND

In multiplexed optical communication networks, a single optical fiber typically carries a signal having multiple independent data channels with each data channel assigned to a different wavelength. Such networks are referred to as wavelength division multiplexed (WDM) networks. In WDM networks, the signal at each of these different wavelengths may be routed to different destinations. However, if a signal has too much power, it may overload a receiver in the network. An attenuator may be used to reduce signal intensity that may otherwise overload a receiver in the network. An attenuator may also be used for other functions such as to block extraneous signals at other wavelengths and to balance signals transmitted through the same system at different wavelengths.

As signals propagate through the optical fiber, the signals may also experience both transmission losses and coupling losses at points along the network. In order to compensate for these losses, WDM networks often include optical amplifiers at various points in the network to amplify the signals. A fiber amplifier may not amplify all wavelengths equally, since fiber amplifier gain typically varies with wavelength. This causes some wavelengths in a WDM signal to become stronger than others.

One problem with prior WDM networks is the amplification gain provided by the amplifiers may be uneven, such that certain wavelengths are amplified to a greater degree than other wavelengths. As the amplified signals experience successive losses and amplification, the variations in intensity between the different wavelengths increases. Such non-uniformity in losses and gains accumulates and causes transmission errors in the form of interchannel crosstalk and data loss unless the signals are equalized. An equalizer may be used to compensate for these differences by transmitting more light at wavelengths where gain is weakest and partially blocking light at wavelengths where gain is strongest.

Figure 1:
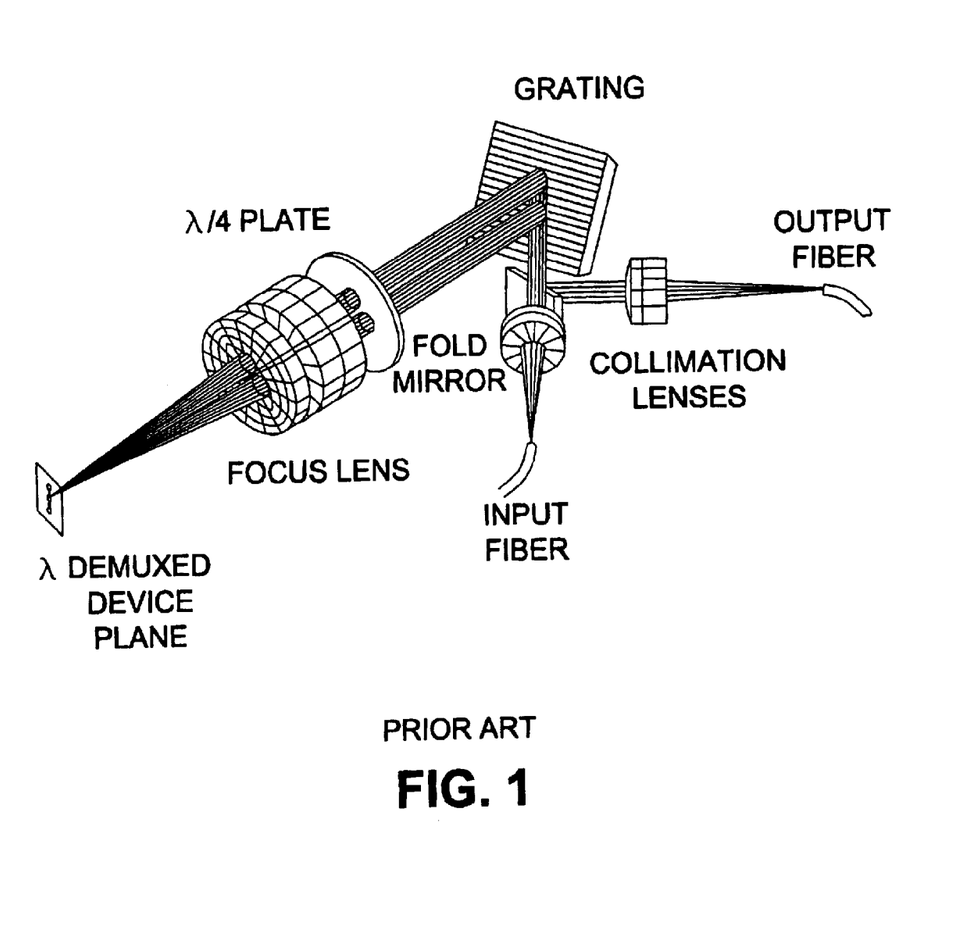
FIG. 1 illustrates a prior art equalizer.

One prior art solution for WDM equalization is illustrated in FIG. 1. An optical signal received from an input fiber at an input port is expanded into a relatively large beam via a collimating lens. The expanded beam illuminates a plane diffraction grating that operates in a reflection mode and light, being reflected, passes through a focusing lens. The diffraction grating disperses the input light by wavelength and the lens focuses reflected light in an attenuation plane. Different wavelengths are focused into different light spots at the attenuation plane, as shown in FIG. 1. In the attenuation plane, an array of optical modulators are spaced at a pitch such that each modulator receives one of the different wavelength signals.

Each optical modulator causes a signal to be produced that corresponds to the signal it receives, except that the signal strength of the reflected signal is attenuated to fall within a desired range. Each signal reflected by the array of modulators is again directed toward the diffraction grating, with all signals directed by a folding mirror toward a second collimating lens. The second collimating lens combines all the signals into a single optical output fiber at the output port.

One problem with such an equalizer is that the use of separate ports for the incoming and outgoing signals and the use of a large number of components may lead to reliability problems and thermal instability of the system. Another problem with prior equalizers is that the large number and size of the components unnecessarily increase the size and cost of the equalizer. For example, the alignment of a large number of components increases manufacturing time and cost.

SUMMARY OF THE INVENTION

The present invention relates to an equalizer, and more specifically to a channel equalizer having a concave diffraction grating to diffract a multiplexed optical signal into a plurality of sub-beams of light and a modulator for receiving the plurality of sub-beams. In the preferred embodiment, the modulator is an array of controllable elements disposed such that each sub-beam of light is selectively attenuated. In one embodiment, the modulator includes a concave surface.

In accordance with the instant invention there is provided an equalizer comprising: a first port for launching a beam of light comprising multiple wavelengths; a dispersive element having a concave surface for dispersing the beam of light into a plurality of sub-beams of light and for focusing each sub-beam of light onto a focal plane thereof; and, a modulator array disposed substantially at the focal plane for receiving the plurality of sub-beams of light and for directing them back to the dispersive element.

In accordance with the instant invention there is provided an equalizer comprising: a first port for launching a multiplexed beam of light; an aberration corrected diffraction grating having a concave surface for spatially dispersing the multiplexed beam of light into a plurality of sub-beams of light and focusing each sub-beam of light onto a focal plane thereof; a modulator array disposed substantially at the focal plane for selectively attenuating each sub-beam of light and reflecting each sub-beam of light back to the diffraction grating for recombination into a single beam of light; and a second port for receiving the single beam of light.

In accordance with the instant invention there is further provided a method of attenuation comprising the steps of: launching light having multiple wavelength signals; diffracting the light and focusing the diffracted light onto a modulator array using a concave diffraction grating; and reflecting the light back to the concave diffraction grating.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

A method and apparatus is described for controlling the attenuation of multiple wavelength signals independently propagating in an optical fiber to provide an output signal having a desired attenuated power in each of the multiple signals.

Figure 2:
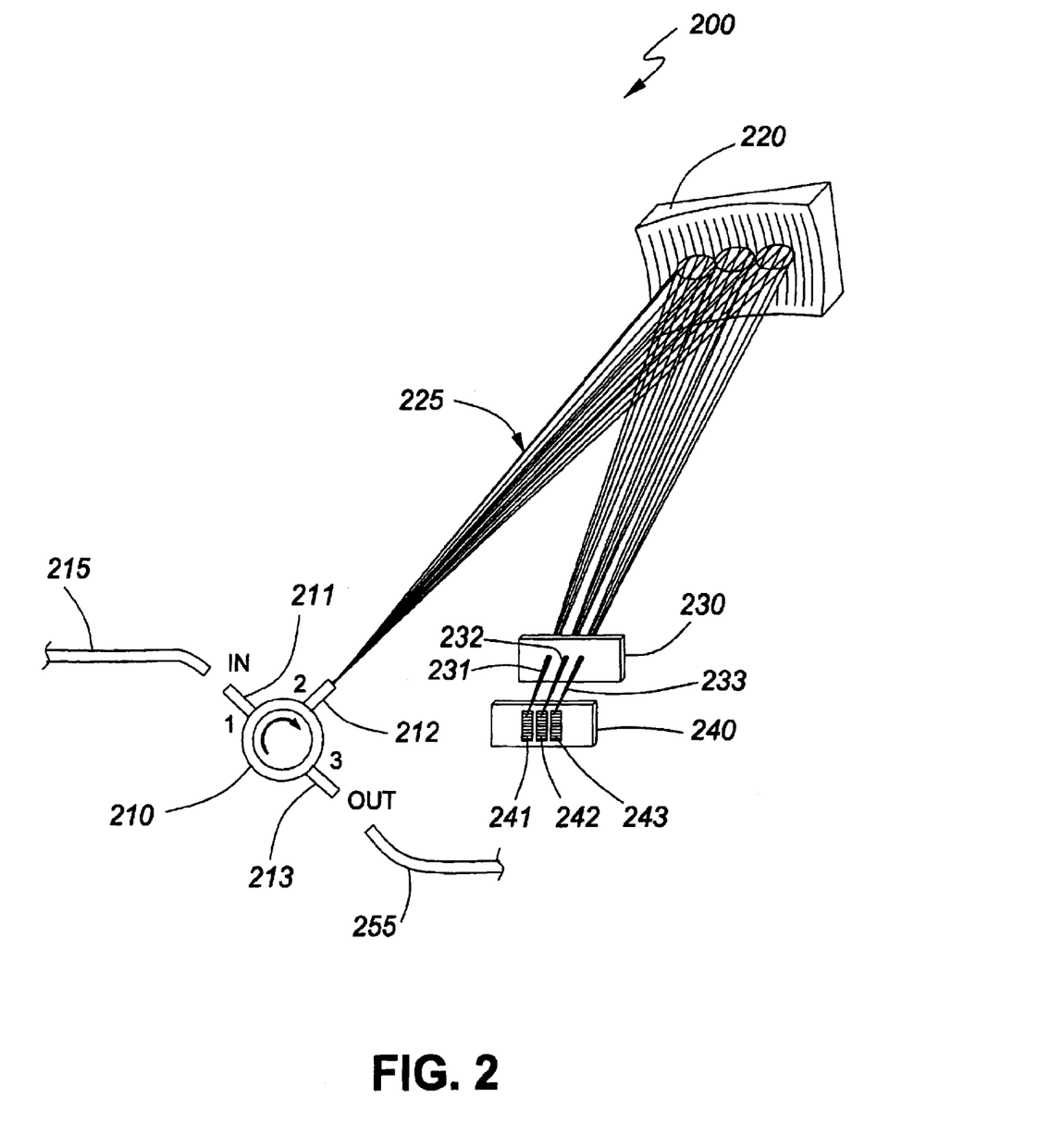
FIG. 2 illustrates one embodiment of an equalizer having a concave diffraction grating and circulator.

FIG. 2 illustrates one embodiment of an equalizer in accordance with the instant invention. The equalizer 200 includes an input optical fiber 215, an output optical fibre 255, a circulator 210, a concave diffraction grating 220, a waveplate 230, and a modulator array 240

Preferably, fibers 215 and 255 are single mode fibers, for example, SMF 28 manufactured by Corning of Coming, N.Y. An SMF 28 fiber has a nominal mode field diameter of approximately 12 microns ($\mu$m). In another embodiment, single mode fibers having other diameters and profiles are used. In yet another embodiment, fibers carrying more than one mode are used.

Preferably, the circulator 210 is any type of circulator used in optical components and networks to direct signals among different optical fibers. A circulator is a non-reciprocal device that circulates the propagation of light in one direction among multiple input/output optical ports, with any two consecutive optical ports operating as optical isolators. For example, light from a first port 211 is propagated to second optical port 212, while light propagation in a reverse direction from second optical port 212 back to first optical port 211 is inhibited. Light input at second optical port 212 is propagated to third optical port 213, while the propagation of light is inhibited from third optical port 213 to second optical port 212. As such, second optical port 212 is a bidirection port that operates as both an input port and an output port. Circulators are well known in the art; accordingly, a detailed discussion is not provided herein.

Preferably, the diffraction grating 220 is an aberration corrected concave diffraction grating, such as a telecommunication, aberration corrected concave diffraction grating, that combines the functions of optical imaging and diffraction into one optical element. Hence, concave diffraction grating 220 not only disperses signal 225, but also focuses the diffracted signal 225 onto modulator array 240. In one embodiment, concave diffraction grating 220 has a diffraction efficiency of approximately greater than or equal to 70 percent in the range of approximately 1530 to 1560 nanometers (nm), with a polarization dependent loss (PDL) less than approximately 0.5 decibels (dB). In another embodiment, concave diffraction gratings of other specifications may be used. Telecommunication, aberration corrected concave diffraction gratings may be obtained from industry manufacturers, such as American Holographic, Inc., of Fitchburg, Mass.

Preferably, waveplate 230 is a quarter waveplate, or other optical component, that in a double pass arrangement provides switching between orthogonal polarization states to cancel polarization dependent diffraction loss. A waveplate is well known in the art; accordingly, a more detailed discussion is not provided.

Preferably, the modulator array 240 is a discrete array of controllable elements (e.g., 241, 242, 243) disposed about the focal plane of the concave diffraction grating 220. For example, liquid crystal arrays and reflective micro electro-mechanical switches (MEMS) are two examples of suitable modulator arrays. A discrete array of addressable polymer dispersed liquid crystal (PDLC) cells or pixels is particularly attractive for use as a modulator array. Each pixel of a PDLC array is designed to attenuate light by scattering the incident light to angles outside the range of angles designed to be coupled back to the circulator 210 by the concave diffraction grating 220. The amount of scatter is controlled by the applied electric field across each pixel, allowing control of the effective attenuation. Of course, the modulator array is not limited to the discrete arrays disclosed herein, but extends other arrays capable of selectively attenuating and reflecting the signals back to the concave diffraction grating.

In operation, input signals propagating in fiber 215 come to first port 211 of circulator 210 and emerge from second port 212. The input signals may be multiple wavelength signals. As these multiple wavelength signals 225 exit second port 212, they are incident on diffraction grating 220. The optical signal 225 is dispersed by the diffraction grating 22 according to wavelength, is transmitted through waveplate 230, and is focussed into distinct light spots (e.g., spots 231, 232, and 233) on modulator array 240. More specifically, each light spot (e.g., 231, 232, and 233) is focused onto a corresponding modulator 241, 242, and 243, respectively, of modulator array 240. The modulator array 240 reflects the signals back toward concave diffraction grating 220, where the individual sub-beams are combined into a single beam of light, and focused back into second port 212 of circulator 210. The propagation direction of the signals entering second port 212 is toward third port 213. The attenuated signals exit the third port 213 of circulator 210 into fiber 255.

Advantageously, the use of a concave diffraction grating 220 to focus signals to and from modulator array 240, eliminates the use of collimating and focusing lenses, for example, gradient index (GRIN) lenses. This reduction in the number of parts used in equalizer 200 significantly reduces cost and improves reliability.

Figure 3:
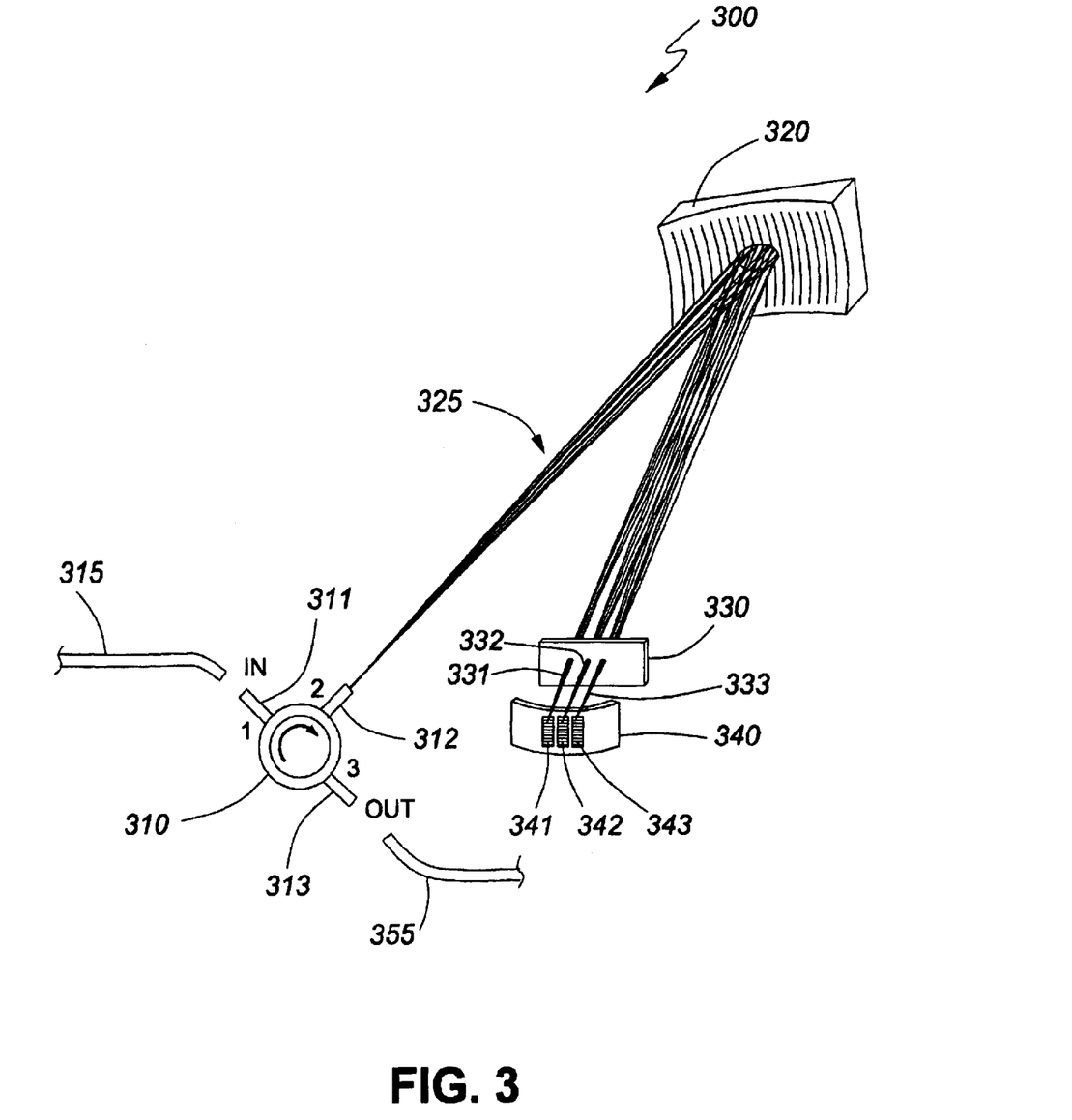
FIG. 3 illustrates an another embodiment of an equalizer having a concave modulator array.

FIG. 3 illustrates an alternative embodiment of an equalizer in accordance with the instant invention. The equalizer 300 includes a circulator 310, a diffraction grating 320, a waveplate 330, and modulator array 340. Preferably, the diffraction grating 320 is an aberration corrected concave diffraction grating, waveplate 330 is a quarter waveplate, and the modulator array is an array of controllable elements, as describe above with respect to FIG. 2. More specifically, each modulator (e.g., 341, 342, and 343) is disposed about a concave surface of the modulator array 340. Preferably, the concave surface is disposed about the dispersion plane of the concave grating 320 and has a radius of curvature approximately equal to or close to the distance from concave diffraction grating 320 to the modulator 240. The radius of curvature in the plane orthogonal to the dispersion plane is arbitrary. For example, sphere or cylinder shapes are equally possible.

In operation, input signals propagating in fiber 315 come to first port 311 of circulator 310 and emerge from second port 312. The input signals may be multiple wavelength signals. As these multiple wavelength signals 325 exit second port 312, they are incident on diffraction grating 320. The optical signal 325 is dispersed according to wavelength, is transmitted through waveplate 330, and is focussed into distinct light spots (e.g., spots 331, 332, and 333) on modulator array 340. More specifically, each light spot (e.g., 331, 332, and 333) is focused onto a corresponding modulator 341, 342, and 343, respectively, of modulator array 340. Modulator array 340 attenuates and reflects the signals back toward concave diffraction grating 320, where the individual sub-beams are combined into a single beam of light, and focused back into second port 312 of circulator 310, where it exits the circulator through third port 313 into fiber 355.

Advantageously, the concave surface of modulator array 340 allows each reflected sub-beam of light to be directed approximately back to the input incident location on concave diffraction grating 320, thus eliminating wavelength dependent insertion loss of equalizer 300 due to tilted incidence onto output fiber 355.

In addition, as previously discussed in relation to FIG. 2, the use of a concave diffraction grating 320 advantageously reduces the number of parts equalizer 300, thereby significantly reducing overall cost and improving reliability.

Figure 4:
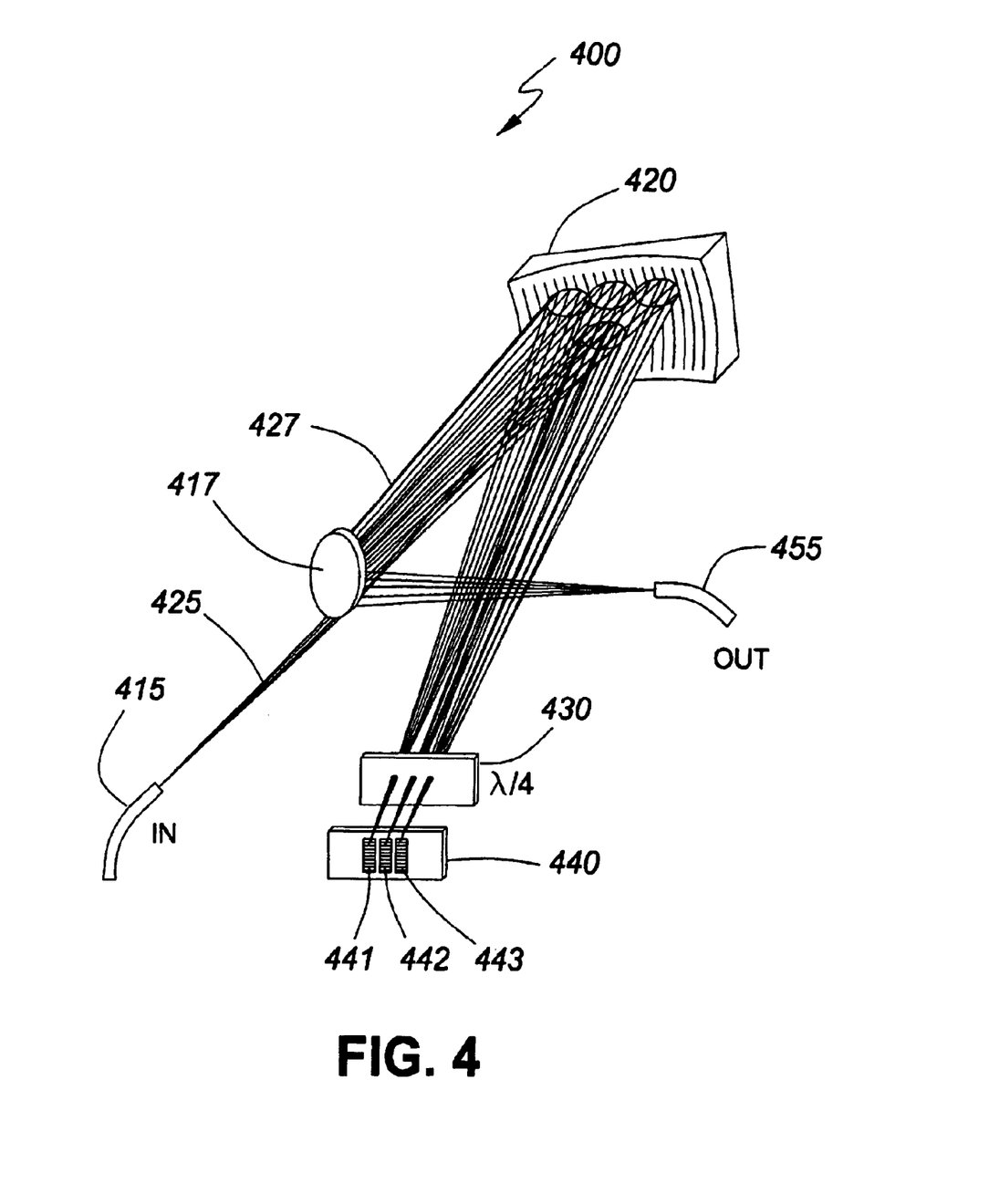
FIG. 4 illustrates an alternative embodiment of an equalizer having a concave diffraction grating and a fold mirror.

FIG. 4 illustrates an another embodiment of an equalizer in accordance with the instant invention. In this embodiment, the position of fibers 415 and 455 and fold mirror 417 are disposed to replace the function of a circulator. Equalizer 400 includes fold mirror 417, concave diffraction grating 420, waveplate 430, and modulator array 440. Preferably, the diffraction grating 320 is an aberration corrected concave diffraction grating, waveplate 330 is a quarter waveplate, and the modulator array 440 is an array of controllable elements, as describe above with respect to FIG. 2. The mirror 417, input optical fibre 415, and output optical fiber 455 are arranged such that an input beam of light launched from input fibre 415 is not blocked from reaching the diffraction grating 420, and such that an attenuated output signal recombined at the diffraction grating 420 is redirected to the output optical fibre 455. More specifically, the facet of input fiber 415 is in the same place as in previous embodiments but the axis is tilted to displace the light signal from the center of concave diffraction grating 420 so that the reflected signal 427 from modulator 440 is spatially separated from the input signal 425. Fold mirror 417 is place in appropriate position such that fold mirror 417 does not block incoming signal 425, but intercepts diffracted signal 427.

In operation, input signals 425 propagating in fiber 415 are incident on concave diffraction grating 420. The input signals 425 may be multiple wavelength signals. The optical signal 425 is dispersed according to wavelength, is transmitted through waveplate 430, and is focussed into distinct light spots (e.g., spots 431, 432, and 433) on modulator array 440. More specifically, each light spot (e.g., 431, 432, and 433) is focused onto a corresponding modulator 441, 442, and 443, respectively, of modulator array 440. Modulator array 440 attenuates and reflects the signals back toward concave diffraction grating 420, where the individual sub-beams are combined into a single beam of light. More specifically, the reflected signal 427 is incident on concave diffraction grating 420 at a location that is displaced from the location of incidence of signal 425. The reflected signal 427 is displaced such that concave diffraction grating 420 focuses the reflected signal 427 toward fold mirror 417, which redirects the reflected signal 427 towards fiber 455.

Advantageously, the embodiment shown in FIG. 4 reduces insertion loss caused by a double pass through the circulator.

Figure 5:
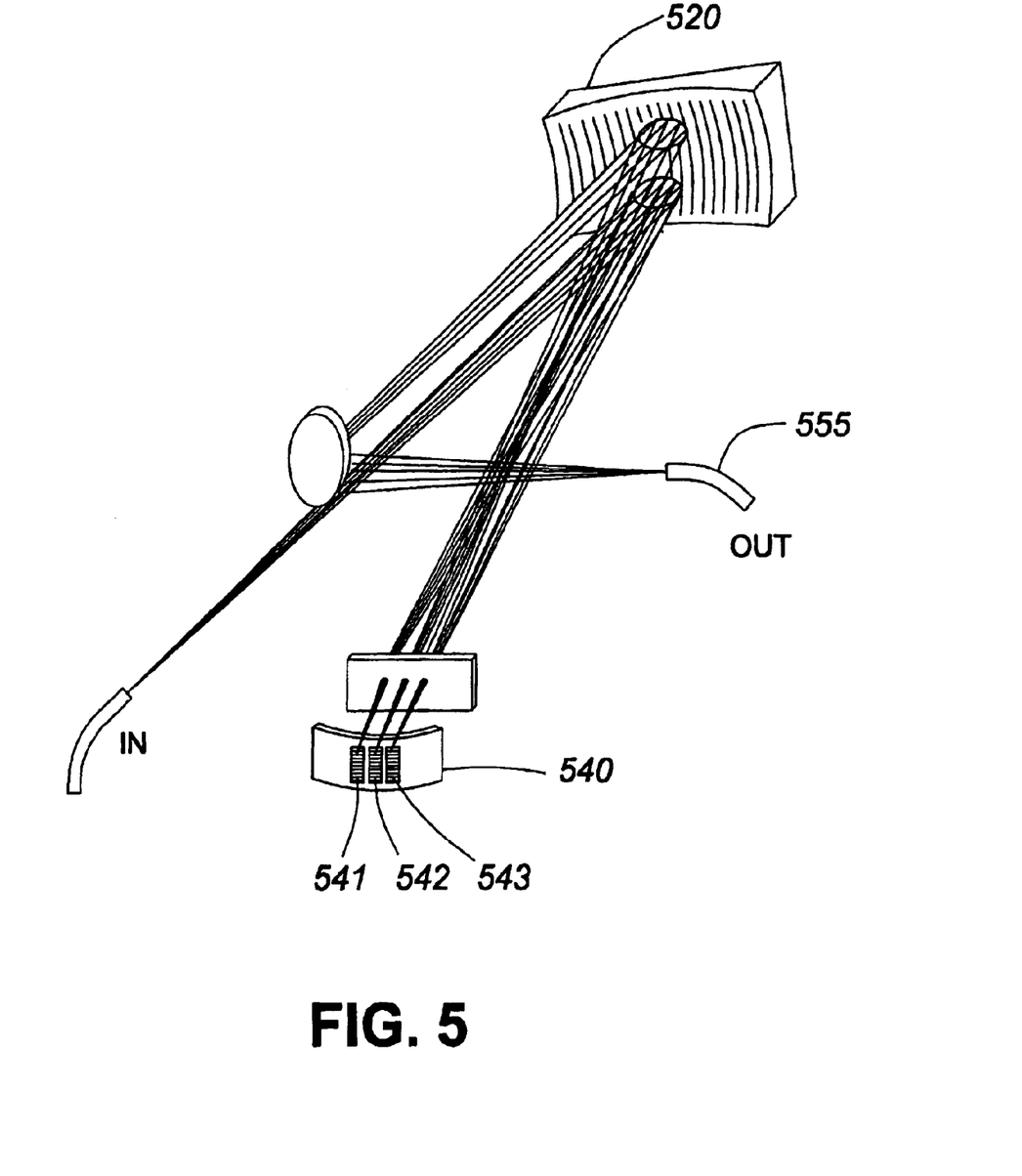
FIG. 5 illustrates yet another embodiment of an equalizer having a fold mirror and a concave modulator array.

FIG. 5, illustrates the equalizer shown in FIG. 4 wherein each modulator (e.g., 541, 542, 543) is disposed on a concave surface of the modulator 540 as discussed with respect to FIG. 3. The other components of equalizer 500 are similar to those described above in relation to FIG. 4. The concave surface of modulator array 540 may enable the modulator array to reflect every wavelength almost exactly back to its original location on concave diffraction grating 520 and, therefore, may eliminate wavelength dependent insertion loss of equalizer 500 due to tilted incidence onto output fiber 555.

Figure 6:
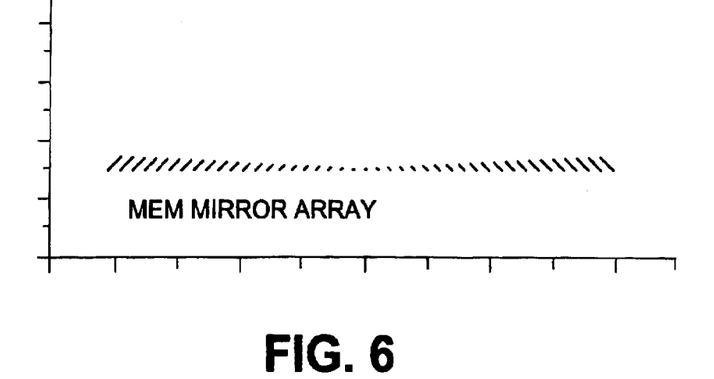
FIG. 6 illustrates one embodiment of a modulator array having micro-electrical-mechanical mirrors.
Figure 7A:
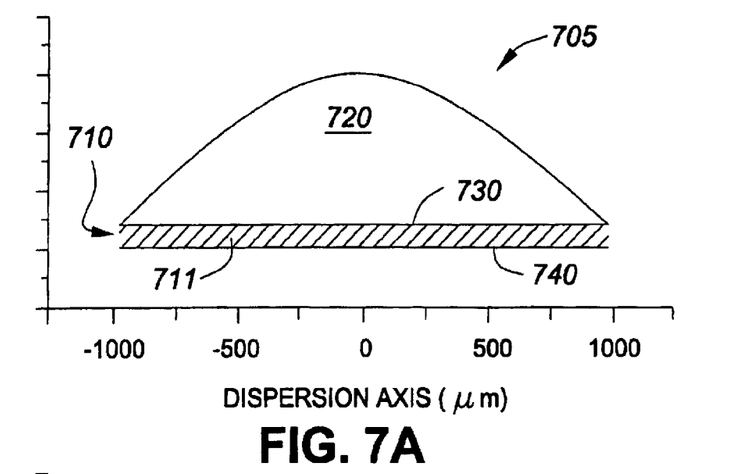
FIG. 7A illustrates an another embodiment of a modulator array having PDLC cells and a concave mirror.
Figure 7B:
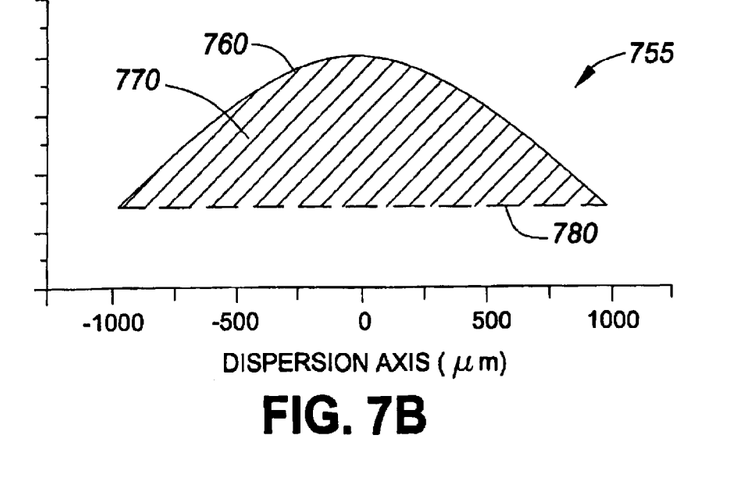
FIG. 7B illustrates an alternative embodiment of a modulator array having PDLC cells and a concave reflective surface.
Figure 8:
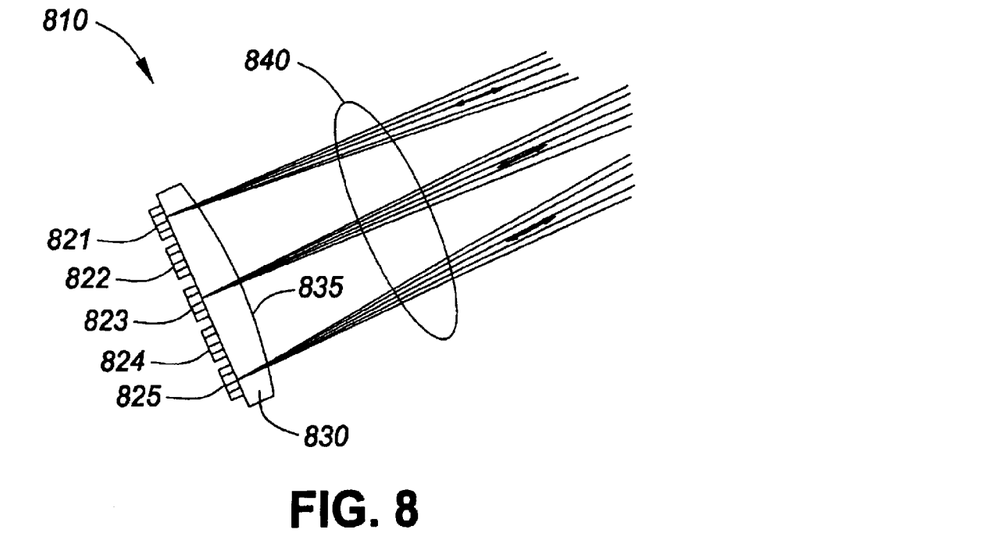
FIG. 8 illustrates yet another embodiment of a modulator array having a plane array of modulators with a refraction convex surface.

FIGS. 6–8 illustrate various embodiments of modulator arrays for use with the equalizers described heretofore, designed to reflect each of the diffracted sub-beams of light back to the concave diffraction grating to substantially the same location, thus minimizing insertion loss of the equalizer.

FIG. 6 illustrates an embodiment of a modulator array wherein each modulator includes a micro-electrical-mechanical (MEM) mirror having a predetermined orientation. More specifically, FIG. 6 illustrates the relative angular position of the titled mirrors in the MEM array. Each mirror of the array is selected to have an initial offset angle corresponding to zero attenuation of the signal. Pre-tilting of the mirrors according to their position in the array allows for the reflection of every sub-beam of light substantially back to its original location on the concave diffraction (e.g., concave diffraction grating 320) to eliminate wavelength dependent insertion loss. MEM mirrors may be used to attenuate light by rotation away from a position corresponding to zero attenuation or ideal alignment. MEM mirrors are well known in the art; accordingly, a detailed discussion is not provided. MEM mirrors may be obtained from industry manufacturers such as Cronos Integrated Microsystems of Morrisville, N.C.

FIG. 7A illustrates another embodiment of a modulator array 705 wherein each modulator includes a polymer dispersed liquid crystal (PDLC) cell. A row of electrically controlled PDLC cells 710 is shown coupled to the surface of a concave mirror 720. Preferably, the row of PDLC cells 710 is coupled to individual transparent electrodes 730 on a backside and a common transparent electrode 740 deposited on a front side. Electrodes 730 and 740 enable the electrical control of the PDLC cells 710. Optionally, the modulator array 705 includes a planar glass substrate that confines the PDLC cells 710. Exact back reflection to the concave diffraction grating (not shown) is realized with reflection from the concave mirror 720.

Light attenuation occurs through a light scattering mechanism that has a small polarization dependence. When a certain voltage is applied to a PDLC cell 711 through one of electrodes 730, PDLC cell 711 becomes transparent to incident light. When the applied voltage decreases, PDLC cell 711 starts to scatter light with the scattering increasing as the applied voltage decreases. PDLC cells are known in the art; accordingly, a detailed discussion is not provided herein. PDLC cells may be obtained from industry manufacturers such as Boulder Nonlinear Systems, Inc., of Lafayette, Colo.

In an alternative embodiment illustrated in FIG. 7B, the modulator array 755 includes a concave mirror 760 having PDLC 770 filled therein. Preferably, the backside of concave mirror 760 is grounded and the surface includes a plane substrate with an appropriate electrode structure 780. Optionally, PDLC thickness variation along optical path is compensated with a variation in the applied voltage.

FIG. 8 illustrates yet another embodiment of a modulator array 810 including PDLC cells 821, 822, 823, 824, and 825 positioned on the backside of a lens 830. The front side of lens 830 is fashioned as convex surface 835 such that refraction at convex surface 835 facilitates more precise reflection of each-sub beam of light substantially back to its original location on the concave diffraction grating within an equalizer (not shown).

Figure 9:
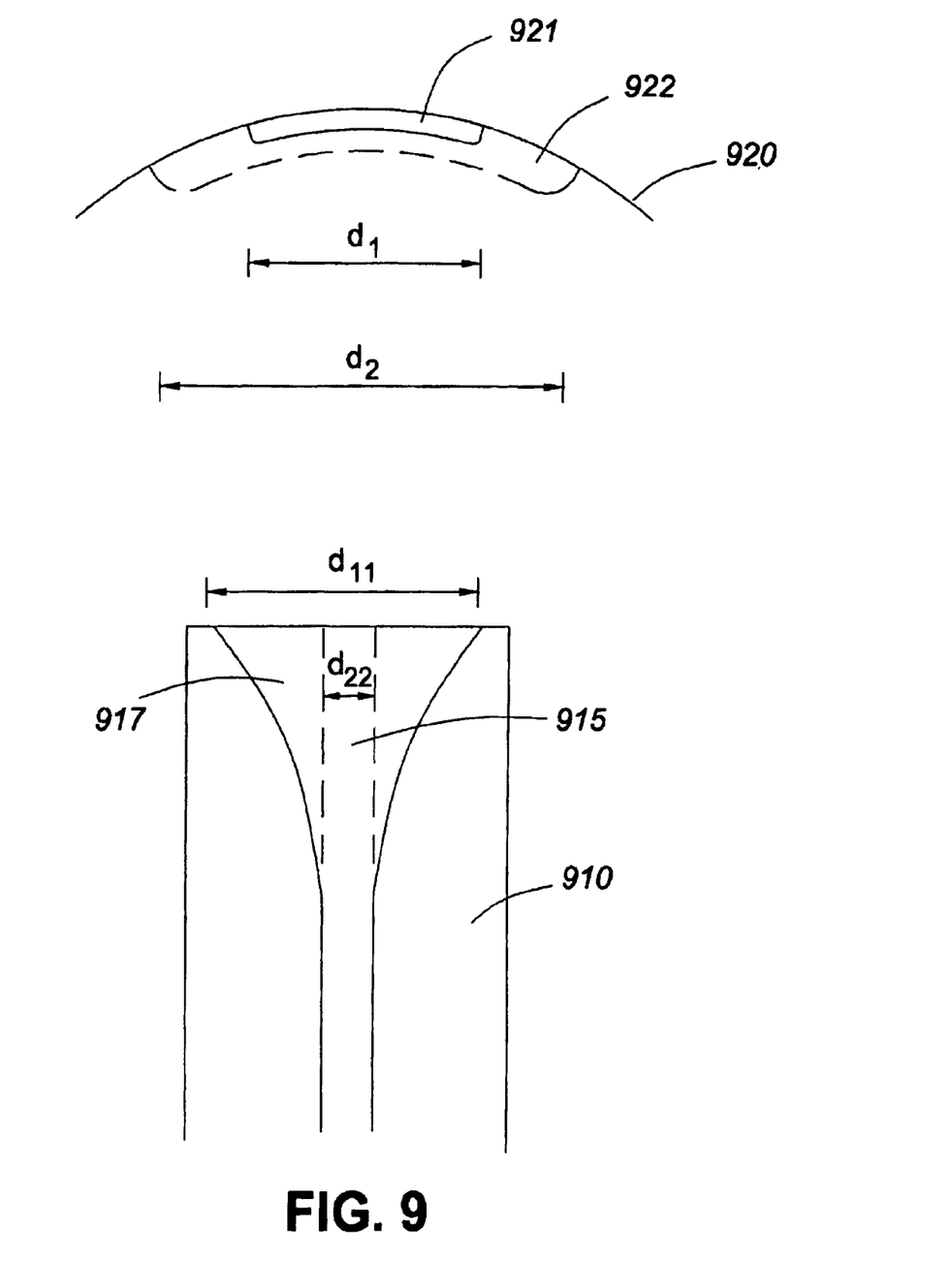
FIG. 9 illustrates one embodiment of an equalizer with a thermally expanded core fiber.

FIG. 9 illustrates one embodiment of an equalizer with a thermally expanded core fiber. In one embodiment, a thermally expanded core (TEC) fiber 910 is used in the one of equalizers described heretofore. A TEC fiber 910 has an expended core at one of the fiber's end coupled to the equalizer. The other end of TEC fiber 910 may remain unchanged to ease splicing and connection with other fibers.

Thermally induced change in the index profile reduces the numerical aperture of a fiber's core and increases its mode field diameter. By using a TEC fiber 910 with a reduced numerical aperture, the dimension of the equalizer may be reduce. The diameter d1 of a light spot 921 on diffraction grating 920 is determined by the numerical aperture and, thus, the diameter d11 of the expanded core 917, of fiber 910. The diameter d2 of a light spot 922 on diffraction grating 920 is determined by the numerical aperture and, thus, the diameter d22 of an unexpanded core 915. As such, the reduced numerical aperture of a fiber 910 with an expanded core 917 provides a smaller light spot 921 on diffraction grating 920. The generation of a smaller spot size on the diffraction grating allows for the use of a smaller diffraction grating, thereby reducing the overall size of the equalizer. In addition, dispersion and other aberrations grow substantially with the diameter of the illumination on diffraction grating 920. Therefore, by using a TEC fiber to reduce the light spot on diffraction grating 920, aberrations in an equalizer are reduced.

Figure 10:
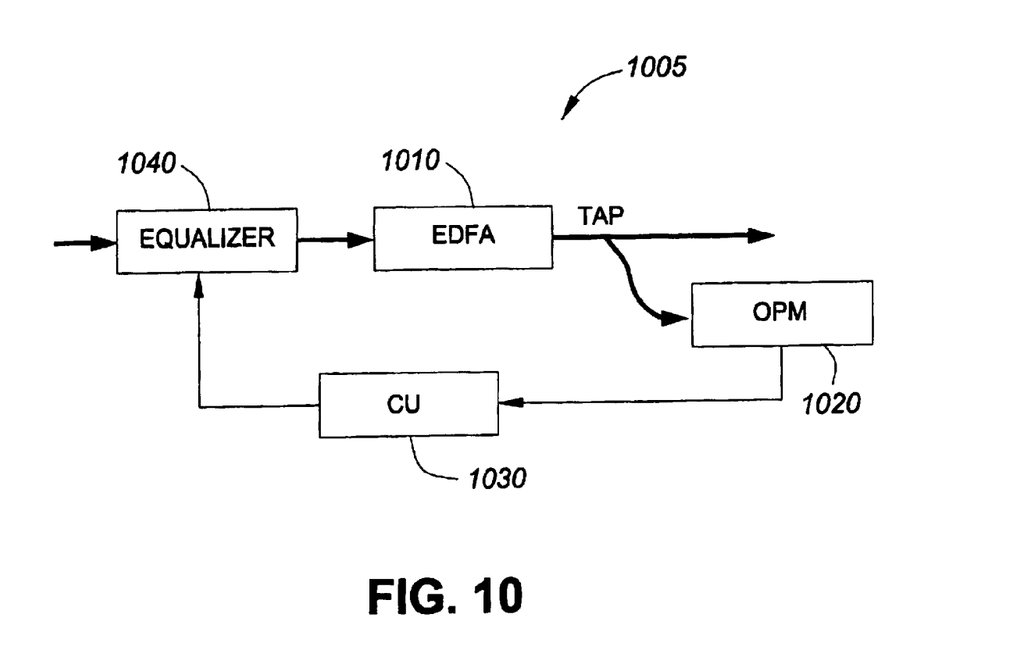
FIG. 10 illustrates one embodiment of a spectra flattening system.

Advantageously, the equalizers described above in relation to FIGS. 2–5 may be used in various types of systems. For example, the equalizers may be used in a system for dynamic spectra flattening, as illustrated in FIG. 10. In one embodiment the spectra flattening system 1005 includes an optical performance monitor (OPM) 1020, an erbium doped fiber amplifier (EDFA) 1010, a control unit (CU) 1030 and an equalizer 1040. The OPM 1020 analyzes wavelength signal power at the EDFA 1010 output and sends appropriate signals to CU 1030. The CU 1030 generates controls to the equalizer's 1040 modulators to attenuate desired optical power at any corresponding wavelength. An OPM, EDFA, and CU are well known in the art; accordingly, a detailed discussion is not provided.

Furthermore, the equalizers and components described above provide enhanced optical performance at a lower manufacturing cost. Such equalizers provide a simple and robust design for multiple wavelength signal attenuation that requires a fewer number of parts to be packaged, thus reducing packaging cost while not sacrificing performance.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense. For example, in FIGS. 2–5 three sub-beams of light and three modulators are shown for exemplary purposes only. More or fewer are also within the scope of the instant invention.

What is claimed is:

1. An equalizer comprising:
   a first port for launching a beam of light comprising multiple wavelengths;
   a dispersive element having a concave surface for dispersing the beam of light into a plurality of sub-beams of light and for focusing each sub-beam of light onto a focal plane thereof; and,
   a modulator array disposed substantially at the focal plane for receiving the plurality of sub-beams of light and for directing them back to the dispersive element;
   wherein the modulator array includes a concave surface; and
   wherein the concave surface of the modulator array has a radius of curvature approximately equal to a focal length of the diffraction grating.

2. The equalizer of claim 1, wherein the dispersive element is an aberration corrected concave diffraction grating.

3. The equalizer of claim 2, wherein the modulator array comprises one of a liquid crystal array, a polymer dispersed liquid crystal array, and a MEMS array.

4. The equalizer of claim 3, wherein the modulator array includes a convex surface.

5. The equalizer of claim 3, wherein the first port is optically coupled to a thermally expanded core optical fiber.

6. The equalizer of claim 3, wherein the first port is coupled to an optical circulator.

7. The equalizer of claim 3, comprising a fold mirror for directing a beam of light transmitted from the diffraction grating to a second port spatially displaced from the first port.

8. The equalizer of claim 7, wherein the first and second ports are optically coupled to input and output waveguides.

9. The equalizer of claim 8, wherein the input and output optical waveguides include thermally expanded core fibers.

10. The equalizer of claim 1, wherein each modulator of the modulator array is disposed about the concave surface of the modular array to direct the plurality of sub-beams of light back to the diffraction grating.

11. The equalizer of claim 1, wherein the concave surface of the modulator array comprises a concave mirror filled with a polymer dispersed liquid crystal.

12. An equalizer comprising:
    a first port for launching a multiplexed beam of light;
    an aberration corrected diffraction grating having a concave surface for spatially dispersing the multiplexed beam of light into a plurality of sub-beams of light and focusing each sub-beam of light onto a focal plane thereof;
    a modulator array disposed substantially at the focal plane for selectively attenuating each sub-beam of light and reflecting each sub-beam of light back to the diffraction grating for recombination into a single beam of light; and a second port for receiving the single beam of light;

wherein the modulator array comprises means for controlling a position of light reflection on the diffraction grating.

13. The equalizer of claim 12, wherein the first and second ports correspond to first and third ports of a three port optical coupler.

14. The equalizer of claim 12, wherein the means for controlling a position of light reflection on the diffraction grating includes an array of micro-electrical-mechanical (MEM) mirrors.

15. The equalizer of claim 14, wherein each of the mirrors in the array of MEM mirrors is rotatable from a position of zero attenuation, in which the mirror reflects a sub-beam of light substantially back to its original location on the concave diffraction grating.

16. A method of attenuation comprising the steps of:

launching light having multiple wavelength signals;

diffracting the light and focusing the diffracted light onto a modulator array using a concave diffraction grating; and reflecting the light back to the concave diffraction grating using a modulator array with a concave surface;

where in the concave surface of the modulator array has a radius of curvature substantially equal to a focal length of the diffraction grating.

* * * * *